(12) United States Patent
Takasu (10) Patent No.: US 6,636,636 B1
(45) Date of Patent: Oct. 21, 2003

(54) CHARACTER RECOGNIZING APPARATUS, METHOD, AND STORAGE MEDIUM

(75) Inventor: Eiji Takasu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/004,847

(22) Filed: Jan. 9, 1998

(30) Foreign Application Priority Data

Jan. 10, 1997 (JP) .............................................. 9-013187

(51) Int. Cl.[7] .................................................. G06K 9/72
(52) U.S. Cl. ...................................... 382/230; 382/310
(58) Field of Search ................................ 382/224, 226, 382/227, 228, 229, 230, 231, 187, 188, 189, 309, 310

(56) References Cited

U.S. PATENT DOCUMENTS 3,188,609 A * 6/1965 Harmon et al. ............. 382/230
4,058,795 A * 11/1977 Balm ......................... 382/230

* cited by examiner

*Primary Examiner*—Christopher S. Kelley
(74) *Attorney, Agent, or Firm*—Fitzpatrick, Cella, Harper & Scinto (57) ABSTRACT

It is an object of the invention to improve output precision of a final recognition result by further obtaining and applying a forward-chain probability in addition to a backward-chain probability in a Bi-gram statistic process, as a post-processing in the case where a plurality of candidate characters are outputted to one input pattern as a result of character recognition. An apparatus according to the invention has a backward-chain dictionary and a forward-chain dictionary of characters, obtains a chain probability from the i-th character to the (i+1)th character by using the backward-chain dictionary, further obtains a chain probability from the (i+1)th character to the i-th character by using the forward-chain dictionary, and selects the character of the final output result from a plurality of candidate characters on the basis of a value obtained by unifying those chain probabilities.

24 Claims, 12 Drawing Sheets

| ORDER OF INPUT | CANDIDATE RANKING | CODE OF CANDIDATE CHR | OPERATION VALUE |
|---|---|---|---|
| 1 | 1 | 「よ」(YO) | 90 |
|   | 2 | 「ょ」(YO) | 80 |
| 2 | 1 | 「l」(—) | 80 |
|   | 2 | 「る」(RU) | 60 |
|   | 3 | 「ろ」(RO) | 50 |
| 3 | 1 | 「。」(PERIOD) | 90 |
|   | 2 | 「O」(O) | 80 |

| FIRST-CHR CODE | SECOND-CHR TYPE NO. | SECOND-CHR TOTAL NO. | SECOND-CHR CODE | SECOND-CHR NO. | SECOND-CHR CODE | SECOND-CHR NO. |
|---|---|---|---|---|---|---|
| 701 | 702 | 703 | 704 | | 705 | |

| DIRECTORY INFORMATION |
| --- |
| BACKWARD-CHAIN PROBABILITY APPLICATION MODULE |
| FORWARD-CHAIN PROBABILITY APPLICATION MODULE |
| UNIFICATION MODULE |
| OUTPUT MODULE |

FIG. 13

| ORDER OF INPUT | CANDIDATE RANKING | CODE OF CANDIDATE CHR | OPERATION VALUE |
| --- | --- | --- | --- |
| 1 | 1 | 「C」 | 90 |
| | 2 | 「c」 | 80 |
| 2 | 1 | 「O」 | 80 |
| | 2 | 「o」 | 60 |
| | 3 | 「O」 | 50 |
| 3 | 1 | 「。」 | 90 |
| | 2 | 「o」 | 80 |

CHARACTER RECOGNIZING APPARATUS, METHOD, AND STORAGE MEDIUM

BACKGROUND OF THE INVENTION

1. Field of the Invention

The invention relates to a post-process for the purpose of improvement of recognition precision of characters.

The invention intends to select a proper character from character recognition candidates by using a chain probability of a plurality of characters which are continuously inputted.

2. Related Background Art

Among conventional character recognizing apparatuses, there is an apparatus comprising: a pattern matching section for comparing an inputted unknown character pattern with standard patterns which have been prepared as a recognition dictionary in the apparatus, thereby selecting a character code of the standard pattern having high similarity; and a post-processing section for performing a word collating process, a context process, and the like by using recognition candidates obtained from the pattern matching section, thereby outputting a most probable recognition result as a character train.

As a post-process using the context process, an N-gram statistic process to which a chain probability of each character in a character train is applied can be mentioned. The N-gram statistic process uses the chain probability of the following character when a certain character train is given. Particularly, the N-gram statistic process is called a Bi-gram statistic process when the given character train is constructed by two characters and is called a Tri-gram statistic process when it is constructed by three characters.

For example, the Bi-gram statistic process is generally reflected to an on-line character recognition post-process in the following manner.

When the user inputs "xi" (ξ), first, the handwritings of "x" and "i" are matching processed by the pattern matching section which has a dictionary in which a standard pattern of each character has been stored and discriminates the similar character every character in accordance with a shape of the input pattern. It is now assumed that "x" and "y" were selected for one input pattern "x" and ";" and "i" were selected for one input pattern "i" as recognition candidates in accordance with the order from the candidate of high similarity for each input pattern and they were outputted as candidate characters, respectively.

Subsequently, all of the possible combinations of the respective recognition candidates are formed. In this example, four combinations of "x;", "xi", "y;", and "yi" exist. Among them, however, the combination in which the chain probability due to the Bi-gram statistic process using the Bi-gram statistic data which has previously been formed is the highest among those four character trains is "xi". Therefore, a final recognition result is outputted as "xi".

In case of executing the N-gram statistic process as a post-process as mentioned above, it is necessary to preliminarily calculate N-gram statistics data by using sample texts such as newspapers and the like, to store the chain probabilities of the characters derived from the calculated N-gram statistics into the recognizing apparatus as an N-gram dictionary in a format of a file or the like, and to read out and use the chain probabilities at the time of the execution of the recognition.

In case of using the Bi-gram statistic process in the N-gram statistic process of the above conventional character recognizing apparatus, a backward-chain probability such that attention is paid to a certain character and at which probability a character subsequent to the target character occurs is applied. In case of applying the Bi-gram statistic process to the character recognition, however, there is a case where an enough backward-processing effect cannot be obtained so long as only the backward-chain probability is used. For example, it is now assumed that recognition results of three characters of "よろо" are "よエ", "ろろ", and "оО" in accordance with the order of similarity, respectively. From those candidates, when the Bi-gram statistics are applied, a chain probability of "よろ" is the largest in case of the combination of the first and second characters. A chain probability of "IO" is the largest in case of the combination of the second and third characters. Since an operation value of "I" upon pattern matching is better than that of "ろ", the result of "エIO" is finally outputted. According to this result, the number of times of erroneous recognition is larger than that of the recognition result at the time of the pattern matching. There is a problem such that a recognition rate is deteriorated by the post-processing step as mentioned above.

Similarly, three character patterns of "Co." are inputted and each of them is character recognized. Thus, it is now assumed that upper recognition candidate characters of the first pattern are "C" and "c", upper recognition candidate characters of the second pattern are "l", "о", and "O", and upper recognition candidate characters of the third pattern are "." and "о", respectively. When the Bi-gram statistics are applied to those candidates, a chain probability of "Co" is the highest in case of the combination of the first and second patterns and a chain probability of "lo" is the highest in case of the combination of the second and third patterns. Since a similarity operation value of "l" upon pattern matching is better than that of "о", a character train of "Clo" is finally outputted as a recognition result. According to this result, the number of time of erroneous recognition is larger than that in case of outputting the first candidate character upon pattern matching without performing a post-processing.

SUMMARY OF THE INVENTION

The invention is made to solve the above problems and it is an object of the invention to provide character recognizing apparatus and method for realizing the improvement of a recognition rate by further applying a forward-chain probability in addition to a backward-chain probability in a Bi-gram statistic process.

To accomplish the above object, according to claim 1 of the invention, there is provided a character recognizing apparatus for recognizing a plurality of characters by applying a chain probability of a character, comprising: backward-chain probability applying means for applying the chain probability from the i-th character among the plurality of characters to the (i+1)th character; forward-chain probability applying means for applying the chain probability from the (i+1)th character among the plurality of characters to the i-th character; unifying means for unifying results which are respectively obtained from the backward-chain probability applying means and the forward-chain probability applying means and setting a unified result as a post-processing result; and output means for outputting the post-processing result unified by the unifying means as a final recognition result.

According to the invention, by applying the forward-chain probability in addition to the backward-chain probability, the erroneous recognition of a character train which cannot be saved so long as only the backward-chain probability is used can be improved and the recognition rate can be improved. The character train which is displayed as a final recognition result displays a natural result as a sentence that is better than the result so far. There is, consequently, an effect that even if an erroneous recognition character exists, an anxious factor for the erroneous recognition of the user is reduced. Since the post-processing system using a strong restriction between the characters is adopted, the invention effectively functions in a special field or in a case where a range of characters as recognition targets is limited or the like.

DETAILED DESCRIPTION OF THE PREFERRED EMBODIMENTS

Embodiments of the invention will now be described hereinbelow with reference to the drawings.

Although a character recognizing apparatus of an on-line character recognizing system will now be described as an example hereinbelow in the embodiments of the invention, the invention can be also applied to an OCR apparatus.

The invention can be also applied to a post-processing apparatus for inputting a character recognition result from another terminal and merely executing a post-processing to the result. In this case, the post-processing result can be returned to a terminal which performed the character recognition or a terminal which inputted character patterns or the apparatus which executed the post-processing can also display or print and output the result.

First Embodiment

Figure 1:
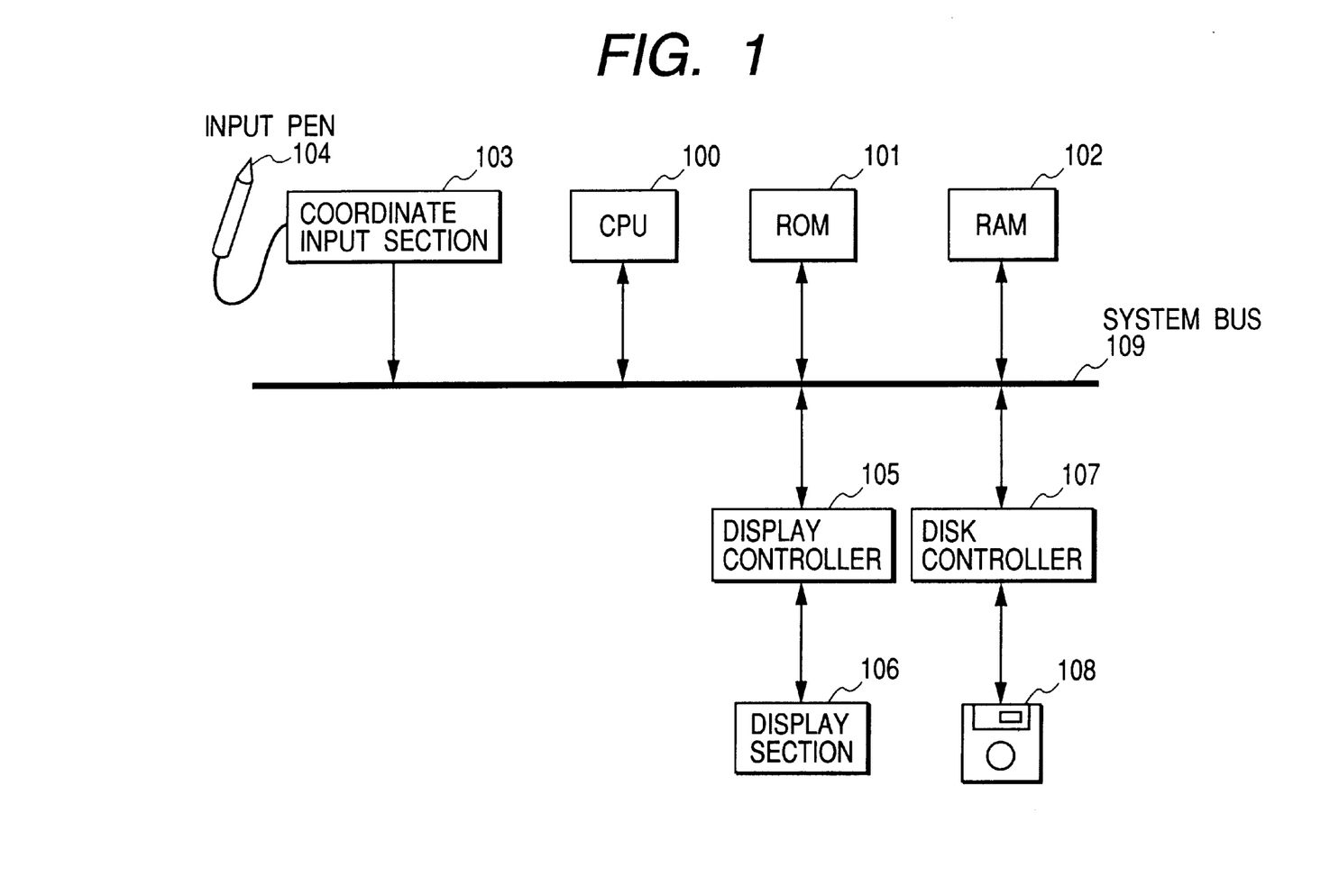
FIG. 1 is a block diagram for explaining a construction of a character recognizing apparatus according to the first embodiment of the invention.

A construction of a character recognizing apparatus according to the first embodiment of the invention will now be described hereinbelow with reference to FIG. 1. FIG. 1 is a block diagram for explaining the construction of the character recognizing apparatus according to the first embodiment of the invention.

First, the character recognizing apparatus has a CPU 100 for controlling the whole apparatus. The CPU 100 is connected to a system bus 109. An ROM 101, an RAM 102, a coordinate input section 103, a display controller 105, a disk controller 107 are connected to the system bus 109. Further, an input pen 104 which is used to input a diagram or characters is connected to the coordinate input section 103. A display section 106 constructed by a CRT or a liquid crystal display (LCD) is connected to the display controller 105. An external memory 108 such as floppy disk, hard disk, or the like is connected to the disk controller 107.

A function of each constructing section will now be described in detail.

The CPU 100 controls the whole apparatus in accordance with control programs, data, or the like stored in the ROM 101. The control programs of flowcharts, which will be explained hereinlater, are stored in the ROM 101.

The RAM 102 is used as a work area of the CPU 100, stores character stroke data or the like which was inputted, and has a memory buffer. The coordinate input section 103 is a digitizer which can input a diagram or characters. Coordinate data of character patterns drawn on the coordinate input section 103 by using the input pen 104 is inputted as input data into the apparatus. The coordinate input section 103 is made up of a transparent electrode and is constructed so as to be overlapped to the display section 106 for displaying an inputted locus or a character font as a recognition result.

The display controller 105 controls the display section 106 for displaying a diagram or characters by the CRT or LCD.

The disk controller 107 controls an interface with the external memory 108 such as floppy disk, hard disk, or the like.

The CPU 100 detects the positions of the coordinates which were continuously inputted for a period of time (period of time of the pen-down state) instructed by the input pen 104. The display section 106 couples the detected coordinates, draws a line, and displays the corresponding dots on the display section 106. Thus, the apparatus operates as if characters or a diagram is written on a paper by a pen.

The character recognizing apparatus reads the control program stored in the ROM 101 by the control of the CPU 100 and stores into the RAM 102 and executes a process such as character recognition or the like after that. Even in case of inputting candidate character trains of character recognition results from another terminal via a communication I/F (not shown), they are stored into the RAM 102 and a post-processing is executed.

The construction as mentioned above is similarly provided for a character recognition dedicated apparatus or a general computer apparatus such as a personal computer or the like. The embodiment can be realized by any one of those apparatuses.

Figure 2:
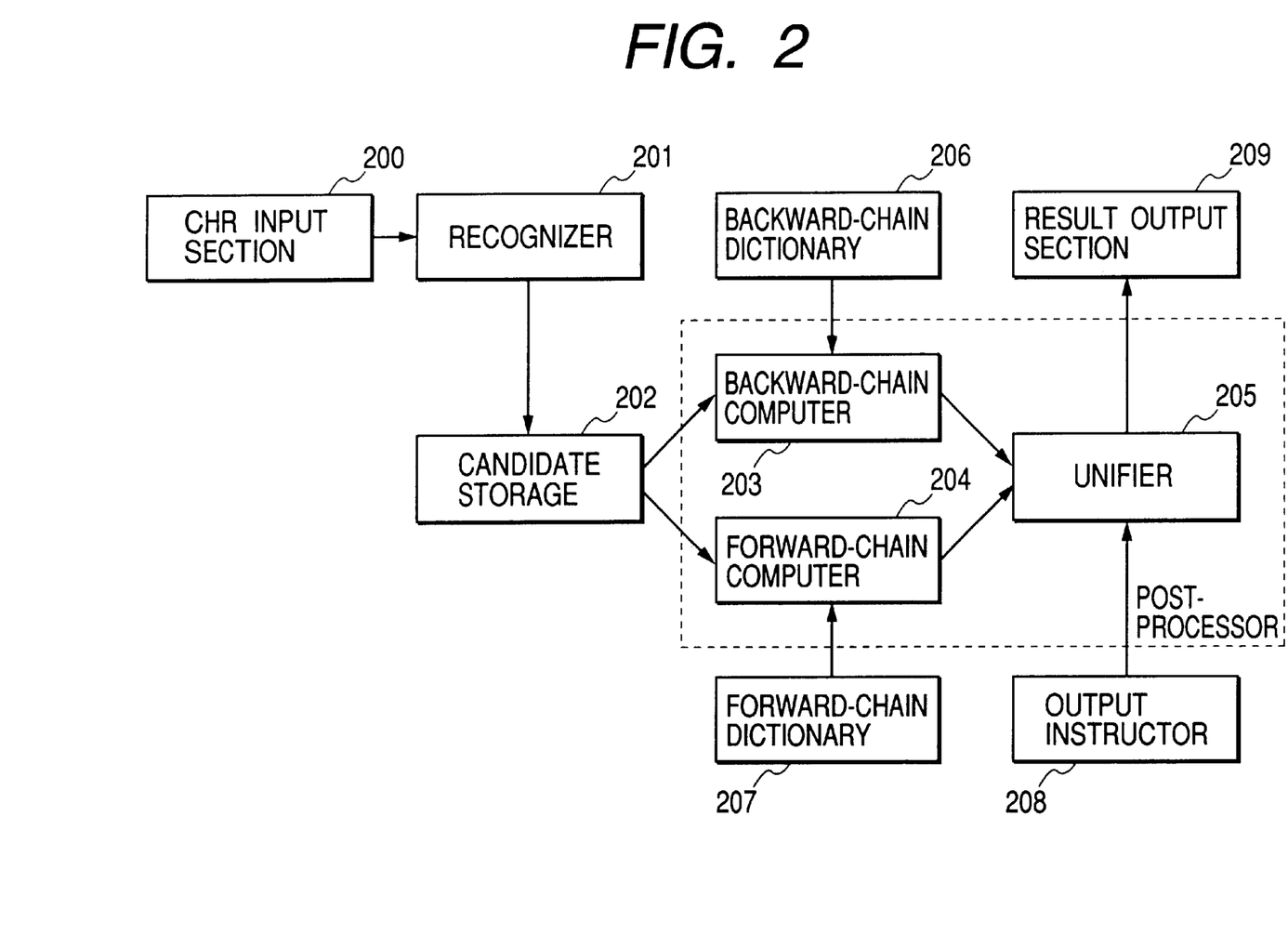
FIG. 2 is a conceptual diagram for explaining a flow of processes of the character recognizing apparatus according to the first embodiment of the invention.

A flow of processes of the character recognizing apparatus according to the first embodiment of the invention will now be described hereinbelow with reference to FIG. 2. FIG. 2 is a conceptual diagram for explaining the flow of processes of the character recognizing apparatus according to the first embodiment of the invention. An arrow in FIG. 2 shows the direction in which data flows. The type of data which is sent from an arrow source side to an arrow destination side differs in dependence on each section.

First, the processes of the character recognizing apparatus are executed in the following total ten sections: namely, a character (CHR) input section 200; a recognizer 201; a candidate storage 202; a backward-chain computer 203 serving as backward-chain applying means; a forward-chain computer 204 serving as forward-chain applying means; a unifier 205 serving as unifying means; a backward-chain dictionary 206; a forward-chain dictionary 207; an output instructor 208; and a result output section 209. The backward-chain computer 203, forward-chain computer 204, and unifier 205 construct a post-processing section.

The above ten sections are control programs stored in the ROM 101 and are read into the RAM 102 when they are executed. Data is stored into the RAM 102. The CHR input section 200 is connected to the candidate storage 202 through the recognizer 201. The candidate storage 202 is connected to the unifier 205 via the backward-chain computer 203 or forward-chain computer 204. The backward-chain dictionary 206 is connected to the backward-chain computer 203. The forward-chain dictionary 207 is connected to the forward-chain computer 204. The output instructor 208 and result output section 209 are connected to the unifier 205, respectively.

First, the CHR input section 200 stores 2-dimensional coordinate data which is sent from the input pen 104 and a coordinate input device such as a tablet or the like.

The recognizer 201 is a portion for performing a pattern matching process every character to an inputted unknown character pattern and standard patterns of characters stored in a recognition dictionary (not shown). Those patterns are compared by calculating city block distances, Euclidean distances, or the like between the inputted unknown character pattern and the standard patterns. The comparison results are sequentially sorted in accordance with the order of similarity. Candidate characters in which the calculated distances are equal to or larger than a predetermined threshold value or upper candidate characters of a predetermined number are transferred to the candidate storage 202 as recognition results in a manner such that a character code and an operation value (showing the similarity) as a set. On the basis of a plurality of unknown character patterns sent from the CHR input section 200, the recognizer 201 outputs the recognition results every character and sends the recognition candidates to the candidate storage 202 on a character unit basis.

Figure 3:
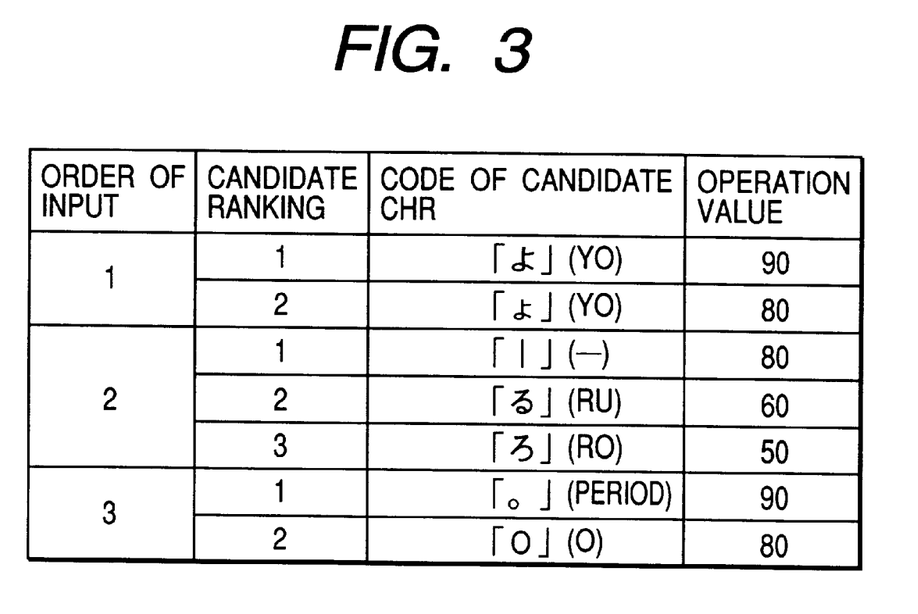
FIG. 3 is a diagram showing the contents of a candidate storage 202 in the conceptual diagram of FIG. 1.

The candidate storage 202 sequentially stores the recognition candidates sent from the recognizer 201. The order of input of the recognition candidates, recognition candidate character codes, and operation values are shown in FIG. 3. FIG. 3 is a diagram showing the contents of the candidate storage 202 in the conceptual diagram of FIG. 1.

Figure 4:
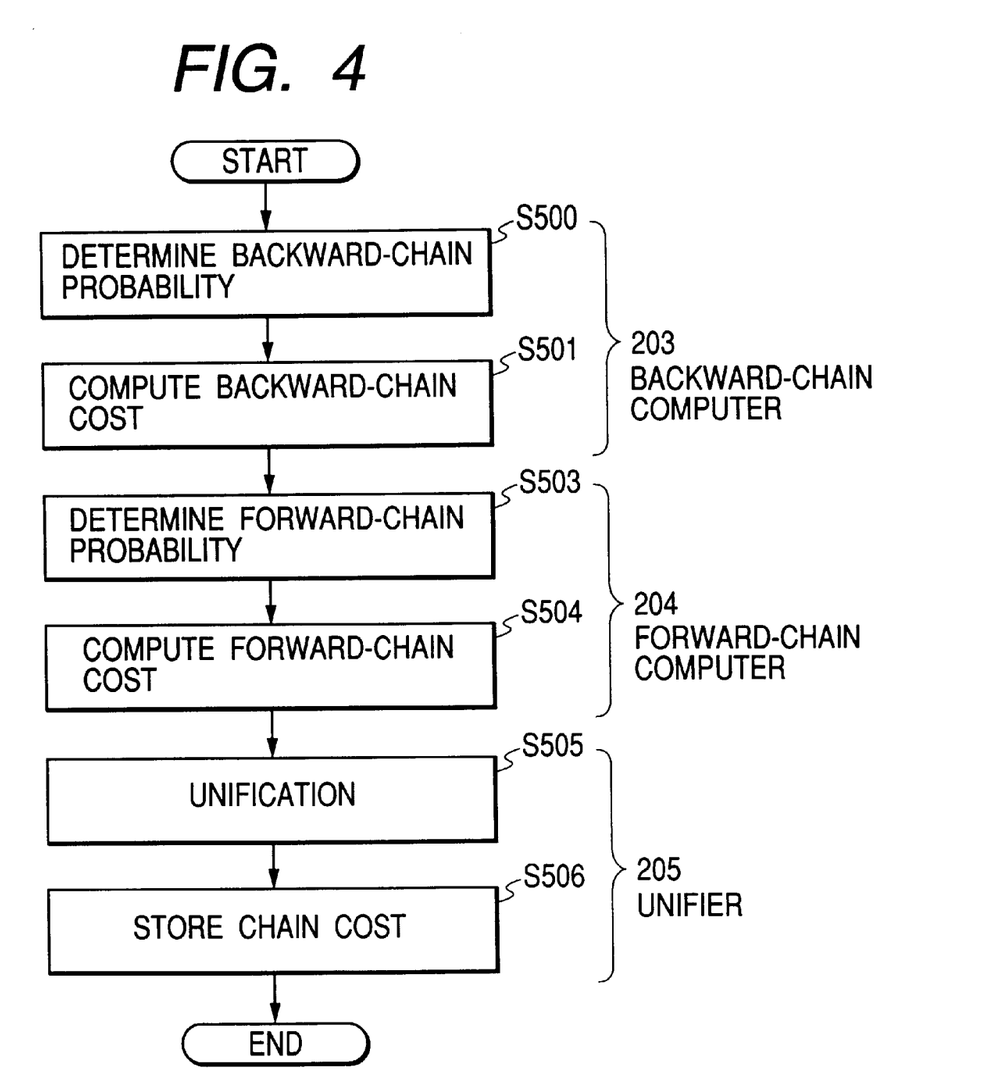
FIG. 4 is a flowchart showing the operation of a post-processing section in the conceptual diagram of FIG. 1.

The backward-chain computer 203, forward-chain computer 204, and unifier 205 constructing the post-processing will now be described with reference to a flowchart of FIG. 4 in addition to FIG. 1. FIG. 4 is a flowchart showing the operation of the post-processing section in the conceptual diagram of FIG. 2.

It is now assumed that the recognition results arrived at the candidate storage 202 from the recognizer 201. When the character of the input order No. 1 in FIG. 3 is stored in the candidate storage 202, the processes of the backward-chain computer 203 are first started. The order of input is the order at which the characters are inputted to the CHR input section 200. In case of the on-line character recognition, the order of input is the order from the early input time. In case of the OCR, the order of input is the cut-out order of the characters.

A backward-chain probability is determined in step S500 in FIG. 4. When the backward-chain probability is determined, the data is read out from the backward-chain dictionary 206.

Figure 5:
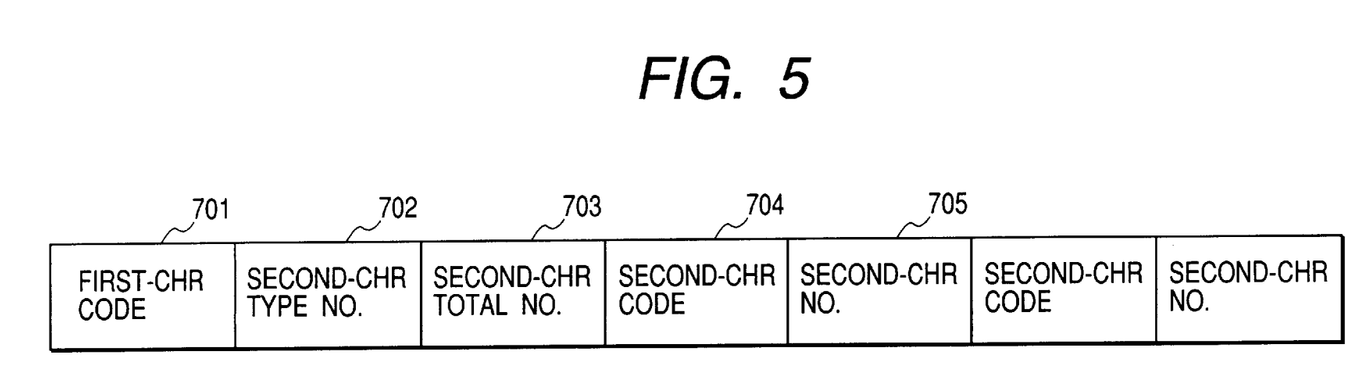
FIG. 5 is an explanatory diagram of a dictionary of a Bi-gram post-processing.

An internal construction of the backward-chain dictionary 206 is as shown in FIG. 5. It is sufficient that it is prepared as data such as a file or the like. FIG. 5 is an explanatory diagram of a dictionary of the Bi-gram post-processing. In FIG. 5, reference numeral 701 denotes a first-CHR code at the head of a character train consisting of two characters; 702 a following second-CHR type number; 703 a second-CHR total number; 704 a second-CHR code; and 705 a second-CHR number. The character type following the first-CHR code 701 is arranged. With the above construction, for example, a chain probability of the second-CHR code 704 following the first-CHR code 701 is shown by a value of (the second-CHR number 705)/(the second-CHR total number 703). After completion of the obtaining of information with respect to all of the character types following the first-CHR code 701, processes for obtaining the information with regard to all of the following character types are repeated by a similar format as for the next head character type. The backward-chain dictionary 206 is formed by previously executing a statistic process to combinations of two continuous characters by using a large amount of data such as a newspaper article or the like by paying attention to the following characters.

Figure 6:
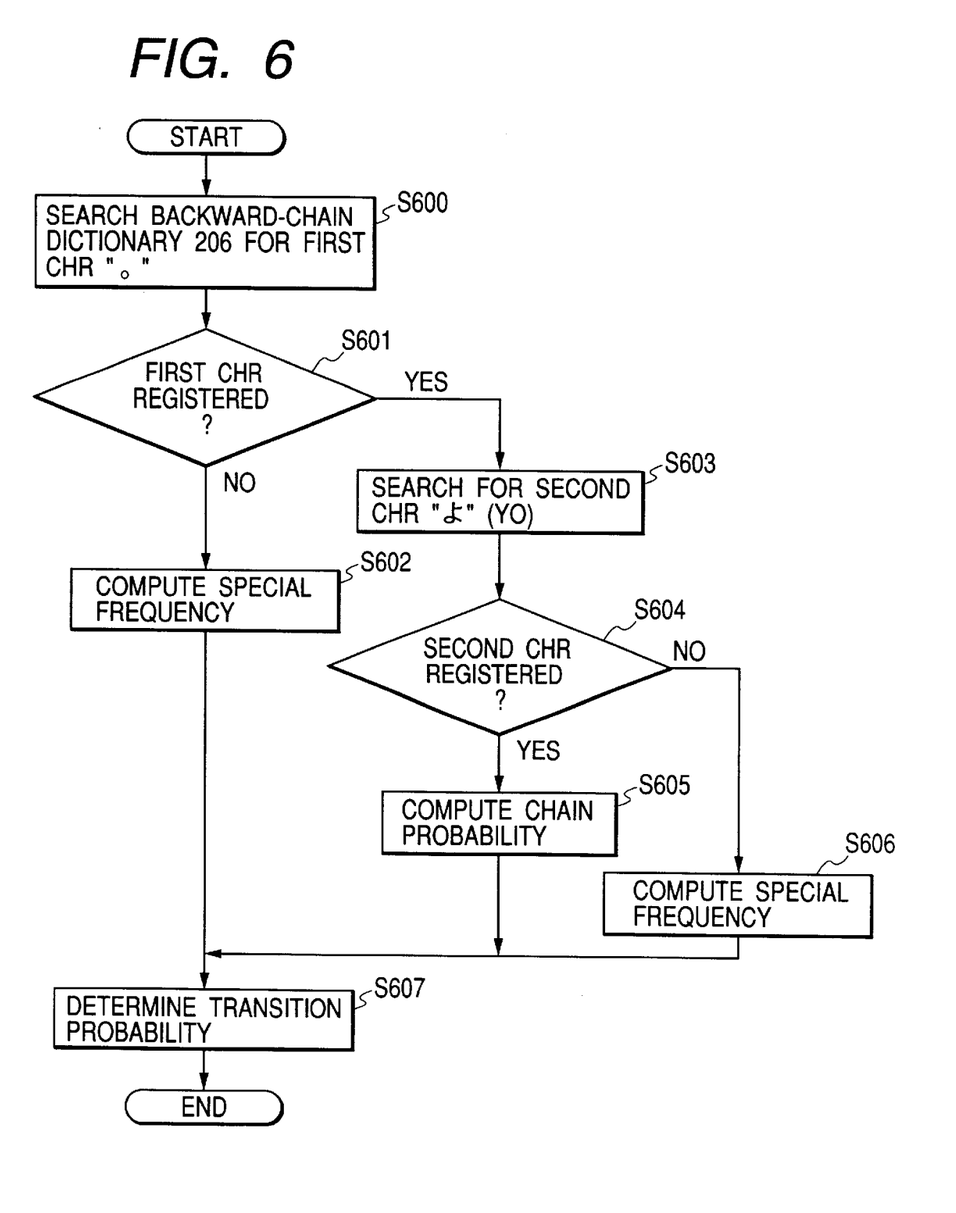
FIG. 6 is a flowchart showing a processing procedure to obtain a transition probability.
Figure 13:
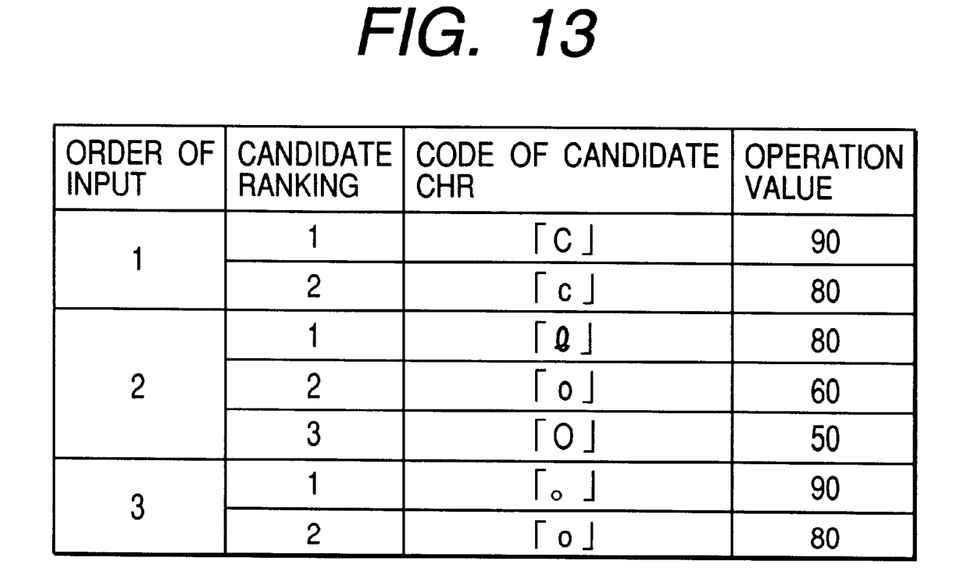
FIG. 13 is a diagram showing the contents of the candidate storage 202 of an English example (corresponding to Fig. 3 of a Japanese example)
Figure 14:
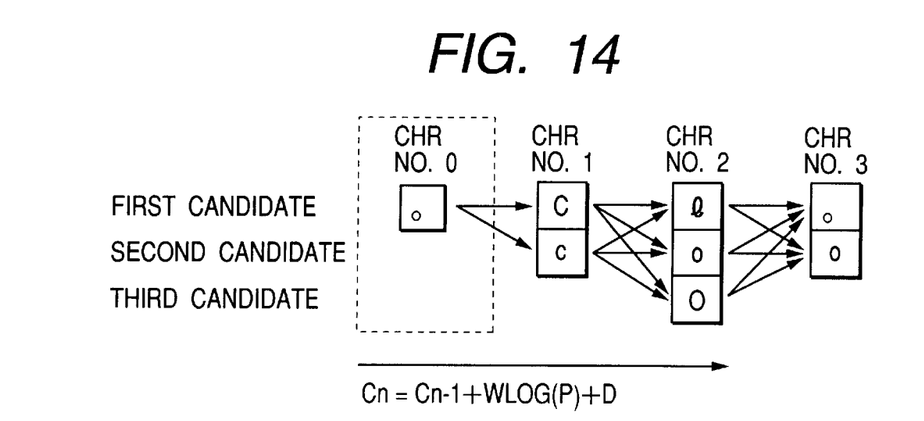
FIG. 14 is an explanatory diagram of a backward-chain process of the English example (corresponding to Fig. 7 of the Japanese example)
Figure 15:
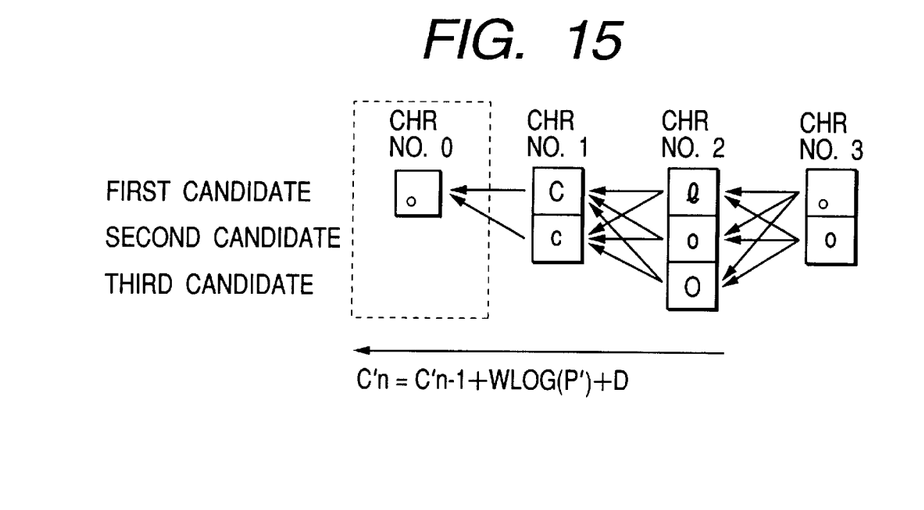
FIG. 15 is an explanatory diagram of a forward-chain process of the English example (corresponding to Fig. 8 of the Japanese example).

The process in step S500 will now be described further in detail hereinbelow with reference to a flowchart of FIG. 6. FIG. 6 is the flowchart showing a processing procedure to obtain a transition probability. Explanation will now be made in detail hereinbelow by using an example of "よる", in which "よる" pronounces "Yo-Ru" and means "Night", used in the explanation of the background art. As English examples corresponding to FIGS. 3, 7, and 8, examples in case of inputting "Co." are shown in FIGS. 13, 14, and 15. Since the processes are substantially the same as those mentioned above by merely replacing such that "よ"→"C", "る"→"o", and "o"→".", their descriptions are omitted here.

First in step S600, in order to obtain the backward-chain probability between two characters, the first character is determined and the backward-chain dictionary 206 is searched. The character of the input order No. 1 is searched by setting the first character to "o", which means "period", and by setting the second character to "よ", which pronounces "Yo", since the recognition candidate just before does not exist. Subsequently, a check is made in step S601 to see if the first character has been registered.

When the relevant first character is not registered in step S601, since the chain probability cannot be calculated from the backward-chain dictionary 206, step S602 follows. A special frequency is calculated in order to determine the chain probability of a character which is not registered in the dictionary. In the special frequency calculation, for example, a value (constant) in which a chain probability has previously been suppressed to a low value is set.

In step S601, if the first character has been registered, step S603 follows and "よ" of the second character is searched in order to discriminate whether the second character has been registered or not.

As a search result in step S603, if "よ" has been registered as a following character of the second character "o", step S605 follows and the chain probability is calculated. The chain probability can be calculated by (the second-CHR No. 705)/(the second-CHR total No. 703) in FIG. 7. On the contrary, if "よ" is not registered in step S604 as a following character of "o", the special frequency is calculated in step S606. This calculation is executed in a manner similar to step S602. After step S602, S606, or S605 was executed, the transition probability is determined (step S607) on the basis of the results of the special frequency calculation in steps S602 and S606 and the chain probability calculation in step S605. In this manner, the backward-chain probability is obtained.

Returning to FIG. 4, a backward-chain cost is calculated by the backward-chain computer 203 in step S501. The calculation of the backward-chain cost is performed as follows. First, a unifying process of the backward-chain probability and recognition operation value which were calculated as mentioned above is executed.

Figure 7:
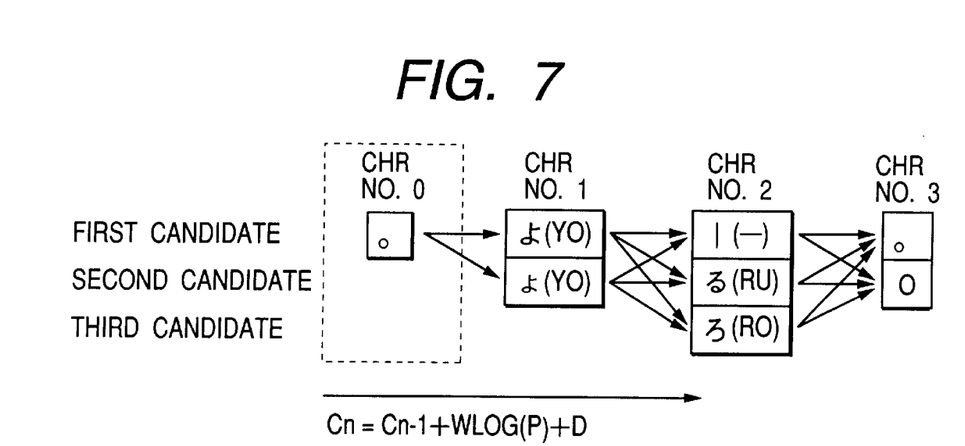
FIG. 7 is an explanatory diagram of a backward-chain process.

The recognition operation value is a value showing a similarity between the character registered in a post-processing dictionary and the character inputted by the user. The unifying process in the backward-chain cost calculation in step S501 is performed on the basis of the following equation shown in FIG. 7.

$$C_n = C_{n-1} + W \cdot \log(P) + d$$

where, $C_n$: cost of the n-th character (the cost denotes a result calculated by this equation) ($C_0 = 0$)

n: the n-th character ($n \geq 1$)

W: weight

P: chain probability d: recognition operation value

When the recognition operation value and the chain probability are unified in order to obtain the cost, a logarithm of the chain probability is obtained in the recognition operation value and a constant value for weighting is multiplied.

The unifying result is called a backward-chain cost here. The backward-chain cost of (the first candidate of the input order No. 0)→(the first candidate of the input order No. 1) is discriminated as $C_{11}$.

In step S501, when the process of the backward-chain computer 203 is finished, step S503 follows and a forward-chain probability is decided by the forward-chain computer 204. When the forward-chain probability is determined, data is read out from the forward-chain dictionary 207. The forward-chain dictionary 207 is formed by performing a statistic process to the combinations of two continuous characters from a newspaper article or the like by paying attention to the character just before in a manner similar to the backward-chain dictionary 206. As a dictionary structure, the format of FIG. 5 can be commonly used.

In case of the forward-chain dictionary 207, the second character becomes the information of the preceding character.

In step S503, the forward-chain probability is determined in accordance with the flowchart of FIG. 6 in a manner similar to step S500. Portions different from the processes in step S500 are that the first character is set to "よ" and the second character is set to "o" and the forward-chain dictionary 207 is used as a dictionary.

In step S504, the forward-chain cost is calculated by the forward-chain computer 207. The forward-chain cost calculation is executed as follows. First, a unifying process of the forward-chain probability and the recognition operation value which were calculated as mentioned above is performed.

Figure 8:
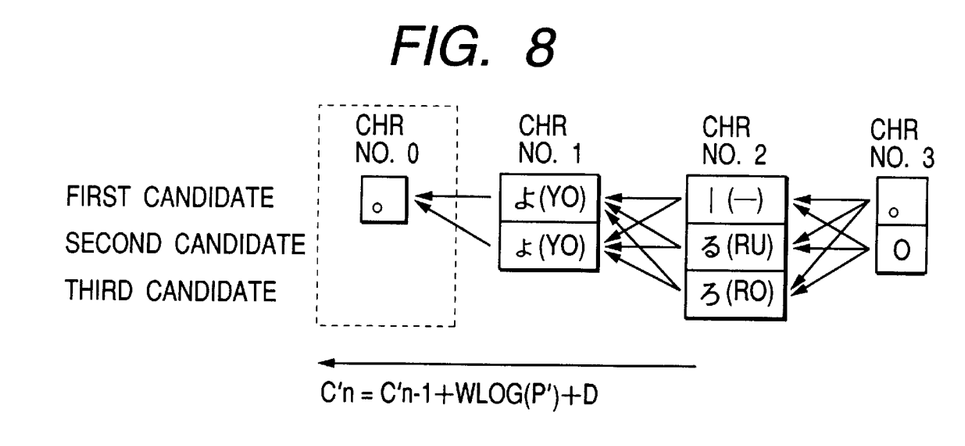
FIG. 8 is an explanatory diagram of a forward-chain process.

The recognition operation value is the value showing a similarity between the character registered in the post-processing dictionary and the character inputted by the user. The unifying process in the forward-chain cost calculation in step S503 is performed on the basis of the following equation shown in FIG. 8.

$$C'_n = C'_{n-1} + W \cdot \log(P) + d$$

where, $C'_n$: cost of the n-th character (the cost denotes a result calculated by this equation) ($C'_0 = 0$)

n: the n-th character ($n \geq 1$)

W: weight

P: chain probability d: recognition operation value

When the recognition operation value and the chain probability are unified, a logarithm of the chain probability is obtained in the recognition operation value and a constant value for weighting is multiplied. The unifying result is called a forward-chain cost. The forward-chain cost of (the first candidate of the input order No. 0)→(the first candidate of the input order No. 1) is discriminated as $C'_{11}$.

In step S504, when the process in the forward-chain computer 105 is finished, step S505 follows and the cost $C_{11}$ obtained in step S501 and the cost $C'_{11}$ obtained in step S504 are unified by the unifier 205. The unifying process is performed by a method of averaging both of those costs. The averaged cost is simply referred to as a chain cost and is labeled as $CC_{11}$. In step S506, the chain cost is preserved and, at the same time, a combination of the characters by which the chain cost is derived is stored.

The above processes (steps S500 to S506) are executed to all of the recognition candidates. That is, combinations of the characters are fully formed between the 0th recognition candidate and the first recognition candidate, thereby obtaining the backward- and forward-chain costs, respectively. With respect to the input order No. 1, two kinds of chain costs are obtained (the chain cost of "oよ" is $CC_{11}$ and the chain cost of "oよ" is $CC_{12}$).

Subsequently, when the recognition candidate of the input order No. 2 reaches the candidate storage 202, the chain costs are respectively obtained between the recognition candidate of the input order No. 1 and the recognition candidate of the input order No. 2. However, they are added to each of the chain costs of the previous input order characters

[refer to the first term of the right side of each of the equation $$C_n = C_{n-1} + W \cdot \log(P) + d$$

in FIG. 7 and the equation $$C'_n = C_{n-1} + W \cdot \log(P) + d$$

in FIG. 8].

At the time point when the recognition candidate of the input order No. 2 is processed, the total number of chain costs is equal to 6.

Figure 9:
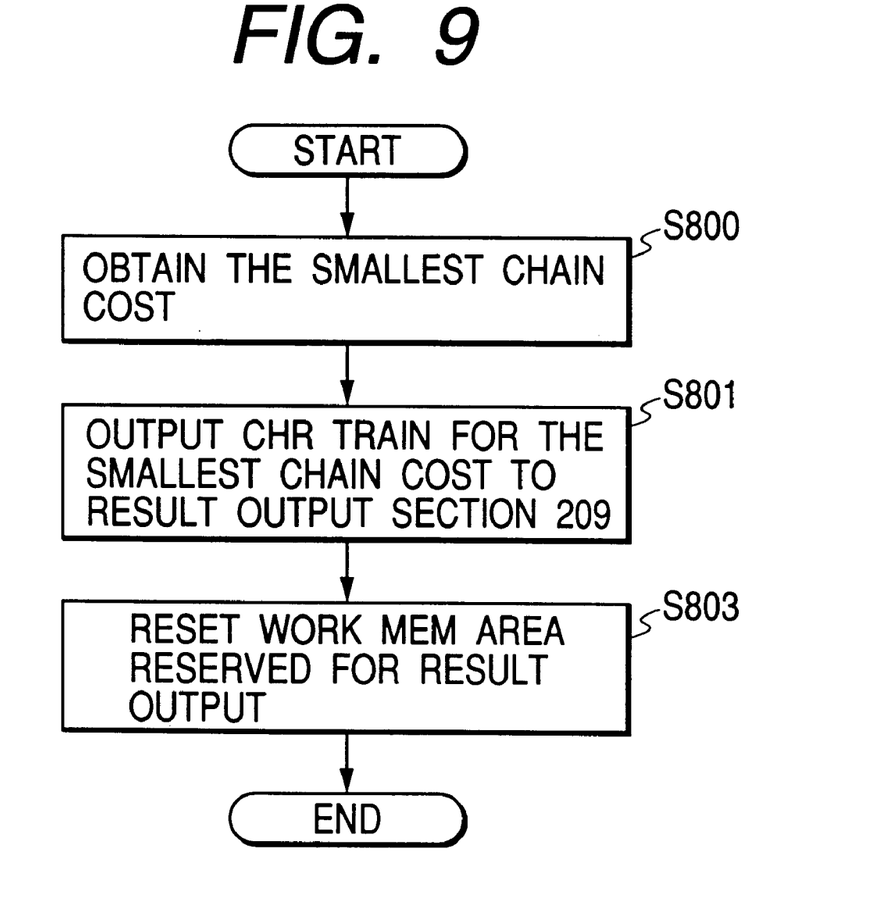
FIG. 9 is a flowchart showing processes of a result output section 209 in the conceptual diagram of FIG. 1.

As mentioned above, each time the recognition candidate reaches the candidate storage 202, the chain costs and the combinations of the characters are preserved. When a signal of a resultant output is generated from the output instructor 208, the unification result is displayed to the result output section 209 by processes of a flowchart of FIG. 9. FIG. 9 is the flowchart showing processes of the result output section 209 in the conceptual diagram of FIG. 1.

In step S800, the smallest chain cost is extracted from a plurality of chain costs preserved in the unifier 205. In step S801, the character combination in which such a minimum chain cost was derived is sent to the result output section 209. In step S803, the work memory area preserved for the resultant output is released and reset. The output instructor 208 can be realized by a button of a character input plate or the like, a command gesture by handwriting, or the like.

According to the above first embodiment, by applying the forward-chain probability in addition to the backward-chain probability, the erroneous recognition of the character train which cannot be saved so long as only the backward-chain probability is used can be improved and the recognition rate can be improved. The character train which is displayed as a final recognition result displays a natural result as a sentence that is more than the result so far. There is, consequently, an effect that, for example, even if an erroneous recognition character exists, an anxious factor for the erroneous recognition of the user is reduced. Since the first embodiment uses the post-processing system using a strong restriction among characters, the invention effectively functions in a special field or in a case where a range of characters as recognition targets is limited or the like.

Second Embodiment

In the above first embodiment, the backward-chain probability and the forward-chain probability have been obtained for all of the recognition candidates which are stored in the candidate storage 202 and the costs have been unified. In the second embodiment, however, only when a special recognition candidate is stored, the forward-chain probability is obtained and the costs are unified. With respect to this point, the first and second embodiments are different.

Figure 10:
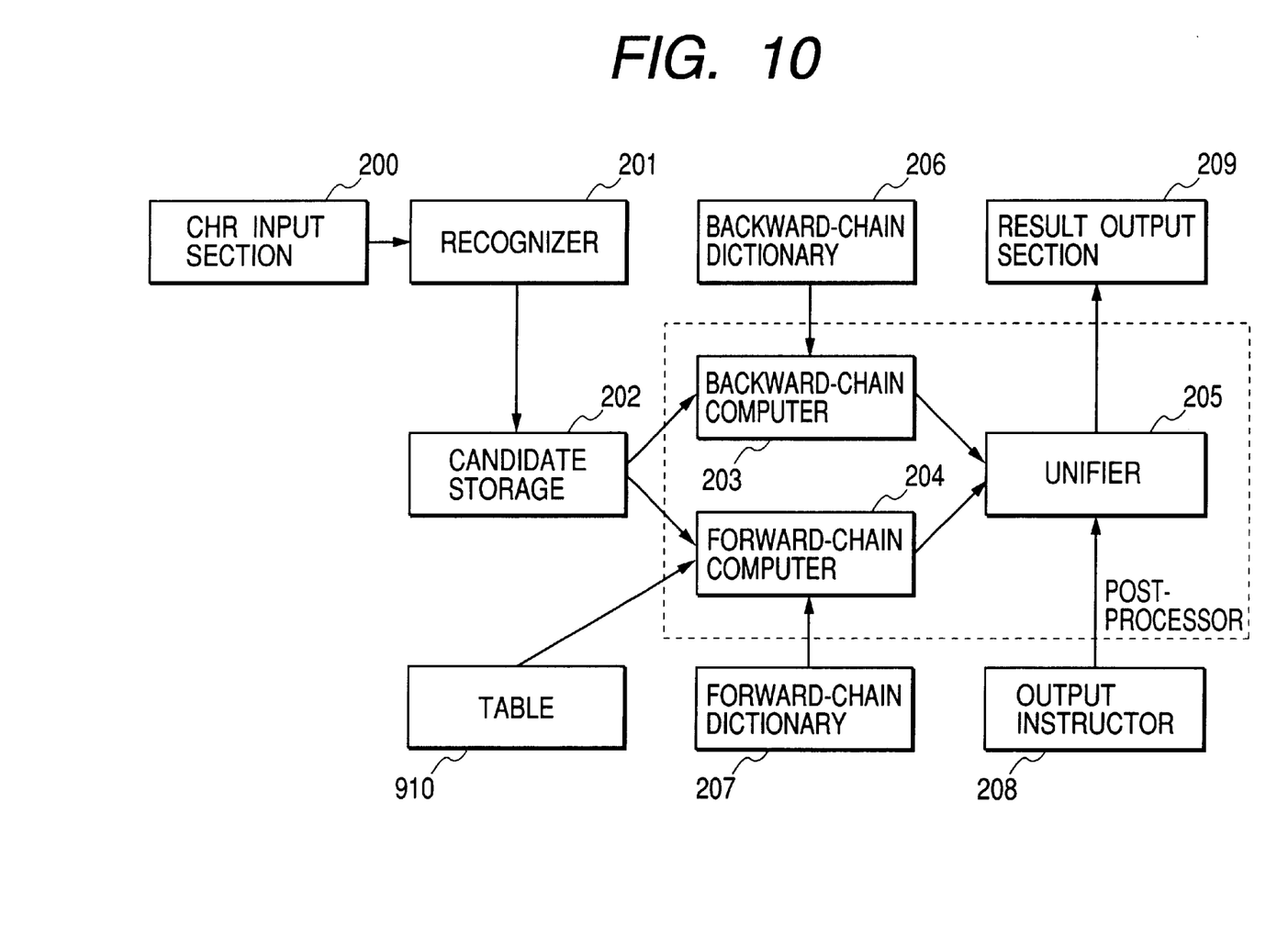
FIG. 10 is a block diagram showing a construction of a character recognizing apparatus according to the second embodiment of the invention.

FIG. 10 is a conceptual diagram showing a construction of a character recognizing apparatus according to the second embodiment of the invention. The character recognizing apparatus shown in FIG. 10 is substantially the same as the character recognizing apparatus shown in FIG. 2 except for a different point that a table 910 is connected to the forward-chain computer 204. Information to make the forward-chain computer 204 operative has been written in the table 910 and the character codes have been stored therein.

Figure 11:
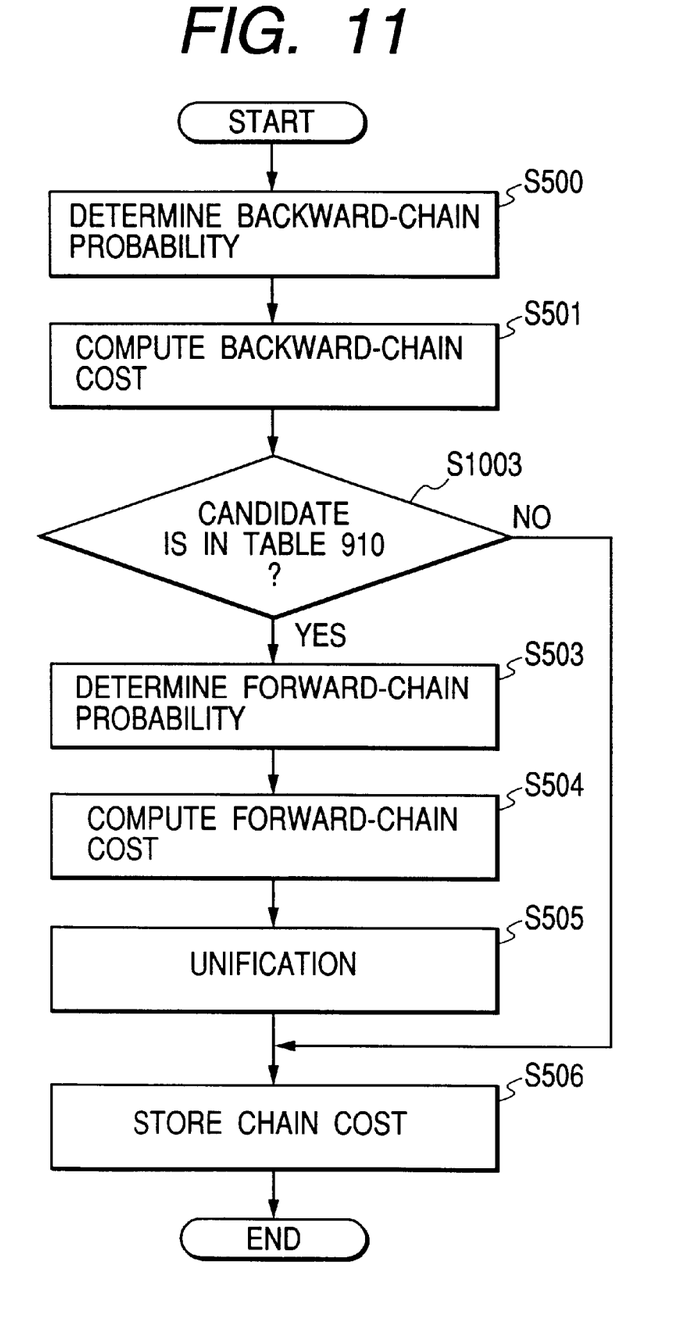
FIG. 11 is a conceptual diagram for explaining a flow of processes of the character recognizing apparatus according to the second embodiment of the invention.

FIG. 11 is a flowchart for processes of the character recognizing apparatus according to the second embodiment of the invention. The flowchart of FIG. 11 is substantially the same as the flowchart of FIG. 4 except for a point that step S1003 is executed after step S501.

In FIG. 11, when the recognition candidate is newly stored in the candidate storage 202, the backward-chain cost is calculated in steps S500 and S501. This process is similar to that in the first embodiment. In step S1003, a check is made to see if the character code in the table 910 exists in the recognition candidates. If the character code exists, step S503 follows and processes similar to those in the first embodiment are executed (steps S503 to S506). If NO, the calculation of the forward-chain cost (step S503) is not executed but step S506 soon follows and the chain cost is preserved.

According to the above second embodiment, since the forward-chain probability can be applied with respect to only a special character train, the improvement of the processing speed can be expected.

It will be obviously understood that the invention can be also applied to the case where it is accomplished by supplying a program to a system or an apparatus. In this case, the program which is expressed by software to accomplish the invention is stored in a storage medium and by reading out the program therefrom to the system or apparatus, the system or apparatus can receive the effect of the invention. In this case, an external storage device is connected to the host computer or printing apparatus of the embodiment and the program or the like stored in the storage medium can be read out.

Figure 12:
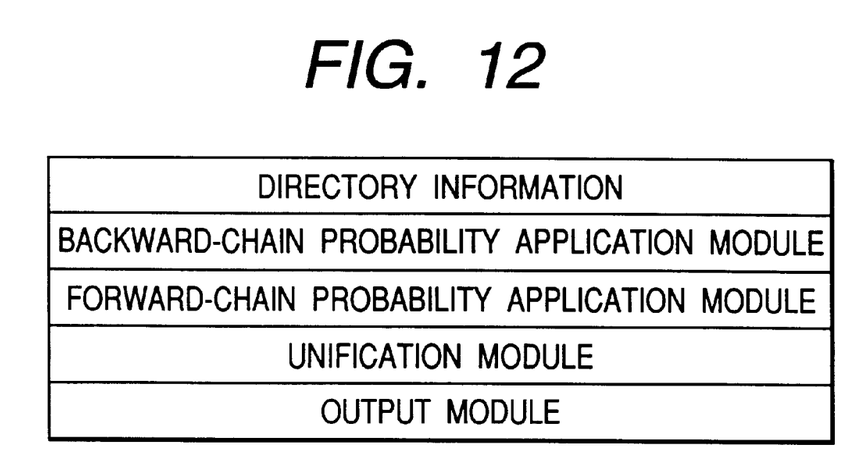
FIG. 12 is an explanatory diagram showing a memory map of a program ROM of an ROM 101 shown in FIG. 1.

FIG. 12 is an explanatory diagram showing a memory map in the program ROM in the ROM 101 shown in FIG. 1 serving as a storage medium which is used in the character recognizing apparatus. Directory information in the diagram shows a storage location where the code in each step has been stored. A module in each step has the following function. That is, a backward-chain probability application module applies a chain probability from the i-th character among a plurality of characters to the (i+1)th character. A forward-chain probability application module applies a chain probability from the (i+1)th character among a plurality of characters to the i-th character. A unification module unifies the results which are respectively obtained in the foregoing backward-chain probability applying step and forward-chain probability applying step, thereby obtaining a post-processing result. An output module outputs the post-processing result unified in the unifying step as a final recognition result.

In addition to the foregoing program ROM, any one of a floppy disk, a hard disk, an optical disk, a magnetooptic disk, a CD-ROM, a CD-R, a magnetic tape, a non-volatile memory card, or the like can be used as a storage medium.

What is claimed is:

1. A character processing apparatus comprising:

backward-chain probability applying means for applying a chain probability from an i-th character to a (i+1)th character among a plurality of characters;

forward-chain probability applying means for applying a chain probability from the (i+1)th character to the i-th character among said plurality of characters;

unifying means for unifying results which are respectively obtained from said backward-chain probability applying means and said forward-chain probability applying means, thereby deriving a post-processing result; and output means for outputting the post-processing result unified by said unifying means as a final result.

2. An apparatus according to claim 1, wherein said plurality of characters include a plurality of candidate characters obtained for one input character, and said unifying means selects the character of the first order from said plurality of candidate characters corresponding to said one input character in accordance with said unified result.

3. An apparatus according to claim 1, wherein said plurality of characters are set to upper-order candidate characters as a result of the recognition of an inputted character pattern.

4. An apparatus according to claim 1, wherein said i-th order and the (i+1)th order are set to the order of input of the characters.

5. An apparatus according to claim 1, wherein said i-th order and the (i+1)th order are set to the order of cut-out of the characters.

6. An apparatus according to claim 1, wherein said unifying means averages numerical value information obtained by said backward-chain probability applying means and numerical value information obtained by said forward-chain probability applying means, thereby outputting an averaging result as said post-processing result.

7. An apparatus according to claim 1, wherein said output means displays a character train as said unified post-processing result.

8. An apparatus according to claim 1, wherein said forward-chain probability applying means selectively operates when a special character train is included in the recognition candidates of the (i+1)th to i-th characters among said plurality of characters.

9. A character processing method comprising:
- a backward-chain probability applying step of applying a chain probability from an i-th character to a (i+1)th character among a plurality of characters;
- a forward-chain probability applying step of applying a chain probability from the (i+1)th character to the i-th character among said plurality of characters;
- a unifying step of unifying results which are respectively obtained in said backward-chain probability applying step and said forward-chain probability applying step, thereby deriving a post-processing result; and
- an output step of outputting the post-processing result unified in said unifying step as a final result.

10. A method according to claim 9, wherein
said plurality of characters include a plurality of candidate characters obtained for one input character, and
said unifying step includes a step of selecting the character of the first order from said plurality of candidate characters corresponding to said one input character in accordance with said unified result.

11. A method according to claim 9, wherein said plurality of characters are set to upper-order candidate characters as a result of the recognition of an inputted character pattern.

12. A method according to claim 9, wherein said i-th order and the (i+1)th order are set to the order of input of the characters.

13. A method according to claim 9, wherein said i-th order and the (i+1)th order are set to the order of cut-out of the characters.

14. A method according to claim 9, wherein in said unifying step, numerical value information obtained in said backward-chain probability applying step and numerical value information obtained in said forward-chain probability applying step are averaged, thereby outputting an averaging result as said post-processing result.

15. A method according to claim 9, wherein in said output step, a character train is displayed as said unified post-processing result.

16. A method according to claim 9, wherein said forward-chain probability applying step selectively operates when a special character train is included in the recognition candidates of the (i+1)th to i-th characters among said plurality of characters.

17. A storage medium in which
- a control program of a backward-chain probability applying step of applying a chain probability from an i-th character to a (i+1)th character among a plurality of characters,
- a control program of a forward-chain probability applying step of applying a chain probability from the (i+1)th character to the i-th character among said plurality of characters,
- a control program of a unifying step of unifying results which are respectively obtained in said backward-chain probability applying step and said forward-chain probability applying step, thereby deriving a post-processing result, and
- a control program of an output step of outputting the post-processing result unified in said unifying step as a final result have been stored and which can be read by a computer.

18. A storage medium according to claim 17, wherein
said plurality of characters includes a plurality of candidate characters obtained for one input character, and
said unifying step includes a step of selecting the character of the first order from said plurality of candidate characters corresponding to said one input character in accordance with said unified result.

19. A storage medium according to claim 17, wherein said plurality of characters are set to upper-order candidate characters as a result of the recognition of an inputted character pattern.

20. A storage medium according to claim 17, wherein said i-th order and the (i+1)th order are set to the order of input of the characters.

21. A storage medium according to claim 17, wherein said i-th order and the (i+1)th order are set to the order of cut-out of the characters.

22. A storage medium according to claim 17, wherein in said unifying step, numerical value information obtained in said backward-chain probability applying step and numerical value information obtained in said forward-chain probability applying step are averaged, thereby outputting an averaging result as said post-processing result.

23. A storage medium according to claim 17, wherein in said output step, a character train is displayed as said unified post-processing result.

24. A storage medium according to claim 17, wherein said forward-chain probability applying step selectively operates when a special character train is included in the recognition candidates of the (i+1)th to i-th characters among said plurality of characters.

* * * * *

UNITED STATES PATENT AND TRADEMARK OFFICE
CERTIFICATE OF CORRECTION

PATENT NO. : 6,636,636 B1
DATED : October 21, 2003
INVENTOR(S) : Eiji Takasu It is certified that error appears in the above-identified patent and that said Letters Patent is hereby corrected as shown below:

Column 2,
Line 9, ""*33*","  should read -- "1*33*", --.

Signed and Sealed this

Thirteenth Day of April, 2004

JON W. DUDAS
*Acting Director of the United States Patent and Trademark Office*